(12) United States Patent
Reddi et al.

(10) Patent No.: US 9,302,688 B2
(45) Date of Patent: Apr. 5, 2016

(54) KNOCK DOWN DRUM TRUCK

(71) Applicant: Wesco Industrial Products, Inc., North Wales, PA (US)

(72) Inventors: Stefan Reddi, Plymouth Meeting, PA (US); Mike Connors, New Hope, PA (US); Jeff Jarrell, Quakertown, PA (US); Ronald Melvin, Perkasie, PA (US)

(73) Assignee: Wesco Industrial Products, Inc., North Wales, PA (US)

( * ) Notice: Subject to any disclaimer, the term of this patent is extended or adjusted under 35 U.S.C. 154(b) by 17 days.

(21) Appl. No.: 14/204,572

(22) Filed: Mar. 11, 2014

(65) Prior Publication Data

US 2015/0259002 A1     Sep. 17, 2015

(51) Int. Cl.
| | |
|---|---|
| B62B 1/00 | (2006.01) |
| B62B 1/04 | (2006.01) |
| B62B 1/06 | (2006.01) |
| B62B 1/08 | (2006.01) |
| B62B 1/26 | (2006.01) |
| B62B 5/06 | (2006.01) |

(52) U.S. Cl.
CPC ... *B62B 1/04* (2013.01); *B62B 1/06* (2013.01); *B62B 1/08* (2013.01); *B62B 1/264* (2013.01); *B62B 5/06* (2013.01)

(58) Field of Classification Search
CPC ........... B65D 2519/00293; B65D 2519/00273; B62B 1/002; B62B 1/264; B62B 1/00; B62B 1/02; B62B 1/04; B62B 1/06; B62B 1/08; B62B 1/10; B62B 1/14; B62B 1/008
USPC ........ 280/47.131, 47.16, 47.17, 47.18, 47.24, 280/47.27, 79.5
See application file for complete search history.

(56) References Cited

U.S. PATENT DOCUMENTS

| | | | | |
|---|---|---|---|---|
| 4,239,249 | A | * | 12/1980 | Sprague ........................ 280/47.2 |
| 2002/0140191 | A1 | * | 10/2002 | Knowlton ................... 280/47.29 |
| 2013/0043663 | A1 | * | 2/2013 | Mitchell et al. ............. 280/47.18 |

OTHER PUBLICATIONS

MORSE The Specialist in Drum Handling Equipment, Model 155 Hand Stand Drum Truck, © 2004 Morse Mfg. Co. Inc., Form PL155, www.MORSEmfgco.com, 3 pages.
Liftomatic—10-HT-4W—Chime Jaw Drum Truck, 1000 lb., 24 In. W, © Neobits, Inc. 2011, http://www.neobits.com/liftomatic_10_ht4w_chime_jaw_drum_truck_1000_lb_p508389 . . . Nov. 5, 2013, 1 page.
MORSE The Specialist in Drum Handling Equipment, Models 152 & 153 Drum Hand Trucks; © 2008, Morse Mfg. Co., Inc., Form PL152-153, Mar. 28, 2008, www.MORSEmffco.com, 2 pages.
Liftomatic Material Handling, Inc. Hand Trucks, 1 page, (Nov. 5, 2013).
Nu-Lift Equipment Co., Ltd. Drum Hand Truck—De Series (Sep. 23, 2013).

* cited by examiner

*Primary Examiner* — Bryan Evans
(74) *Attorney, Agent, or Firm* — Panitch Schwarze Belisario & Nadel LLP

(57) ABSTRACT

A drum truck for handling a drum has a base. A wheel assembly is removably attached to the base. A post is removably attached to the base. The post has a handle. A breakover member is removably and operatively coupled to the base. The breakover member is configured to allow application of a foot pressure to break over the drum truck from a standing vertical position to an angled position. At least one pair of toes is removably attached to the base and configured to support the drum. A drum restraint is removably attached to the post and configured to releasably secure the drum to the post.

18 Claims, 12 Drawing Sheets

KNOCK DOWN DRUM TRUCK

BACKGROUND OF THE INVENTION

The present invention relates to a drum truck. More particularly, the present invention relates to knock-down drum truck which may be shipped disassembled in a compact container and readily assembled and disassembled on site.

Traditional drum trucks are welded assemblies that are shipped via motor freight. The assemblies are generally too large and heavy to be shipped by general purpose parcel ground shippers such as United States Postal Service or FedEx or UPS without incurring excessive shipping costs. Further, the large form factor for the welded assemblies makes the container housing the drum truck difficult to pallet.

Accordingly, there is a need in the art for a knock-down drum truck which may be shipped and stored disassembled in a compact container and readily assembled and disassembled on site. Further, there is a need in the art for a drum truck with multiple removable and interchangeable parts, components and options which can be reconfigured to handle different types of drums.

BRIEF SUMMARY OF THE INVENTION

Briefly stated, one embodiment of the present invention is directed to drum truck for handling a drum. The drum truck has a base. A wheel assembly is removably attached to the base. A post is removably attached to the base. The post has a handle. A breakover member is removably and operatively coupled to the base. The breakover member is configured to allow application of a foot pressure to break over the drum truck from a standing vertical position to an angled position. At least one pair of toes is removably attached to the base and configured to support the drum. A drum restraint is removably attached to the post and configured to releasably secure the drum to the post.

BRIEF DESCRIPTION OF THE SEVERAL VIEWS OF THE DRAWINGS

The following detailed description of preferred embodiments of the invention, will be better understood when read in conjunction with the appended drawings. For the purpose of illustrating the invention, the drawings show embodiments which are presently preferred. It should be understood, however, that the invention is not limited to the precise arrangements and instrumentalities shown.

In the drawings.

DETAILED DESCRIPTION OF THE INVENTION

Figure 1:
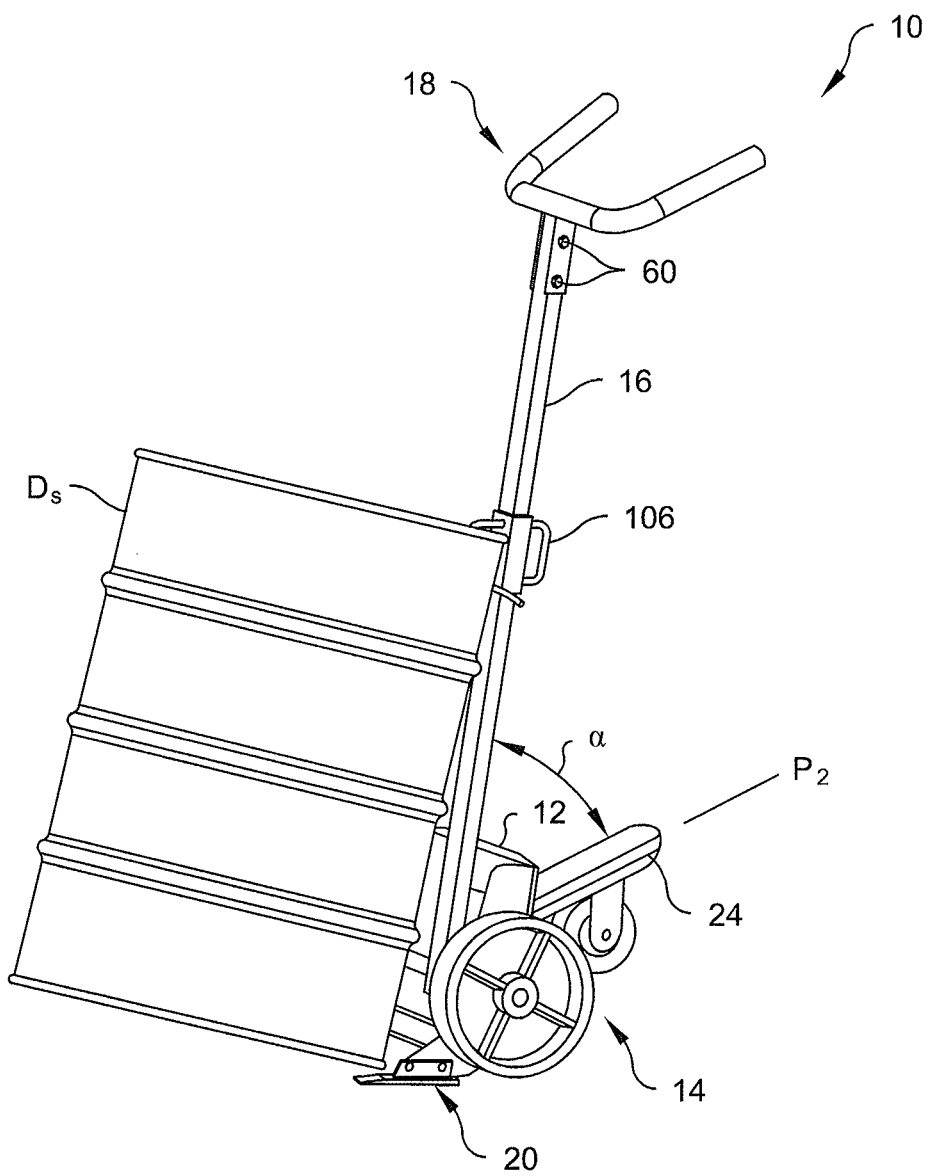
FIG. 1 is a left side perspective view of a first preferred embodiment of the drum truck in accordance with the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower," "upper," "forwardly" and "rearwardly" designate directions in the drawings to which reference is made. The words "inwardly" and "outwardly" refer to directions toward and away from, respectively, the geometric center of the drum truck, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first end could be termed a second end, and, similarly, a second end could be termed a first end, without departing from the scope of the present invention.

The following description is directed towards various embodiments of a knock-down drum truck in accordance with the present invention.

Referring to the drawings in detail, where like numerals indicate like elements throughout, there is shown in FIGS. 1-16 a first preferred embodiment of the knock-down drum truck generally designated 10, and hereinafter referred to as the "drum truck" 10 in accordance with the present invention. The drum truck 10 is intended for use in handling drums fabricated from various materials such as steel (or other metals) hereafter referred to as the "drum $D_s$," and/or other materials such as polymerics or composites hereafter referred to as the "drum $D_p$," and having a range of sizes: suggestedly at least about ten gallon, desirably twenty or more gallons, preferably between about thirty to eighty-five gallons. The drum truck 10 can be assembled in a plurality of configurations depending on the size and type of drum being handled. The load bearing components of the drum truck 10 may be fabricated from steel, other metals, polymeric or composite materials selected based on the intended operating environment and the size and type of drum being handled.

Referring to FIGS. 1-4, the drum truck 10 comprises a base 12 to which a wheel assembly 14, a post 16 with a reversible handle 18, at least one pairs of toes 20 and a breakover member such as a back rest/breakover bar 22 or alternatively a 3$^{rd}$ wheel/breakover bracket 24 with a pivot wheel caster 108 are removeably attachable.

Figure 5:
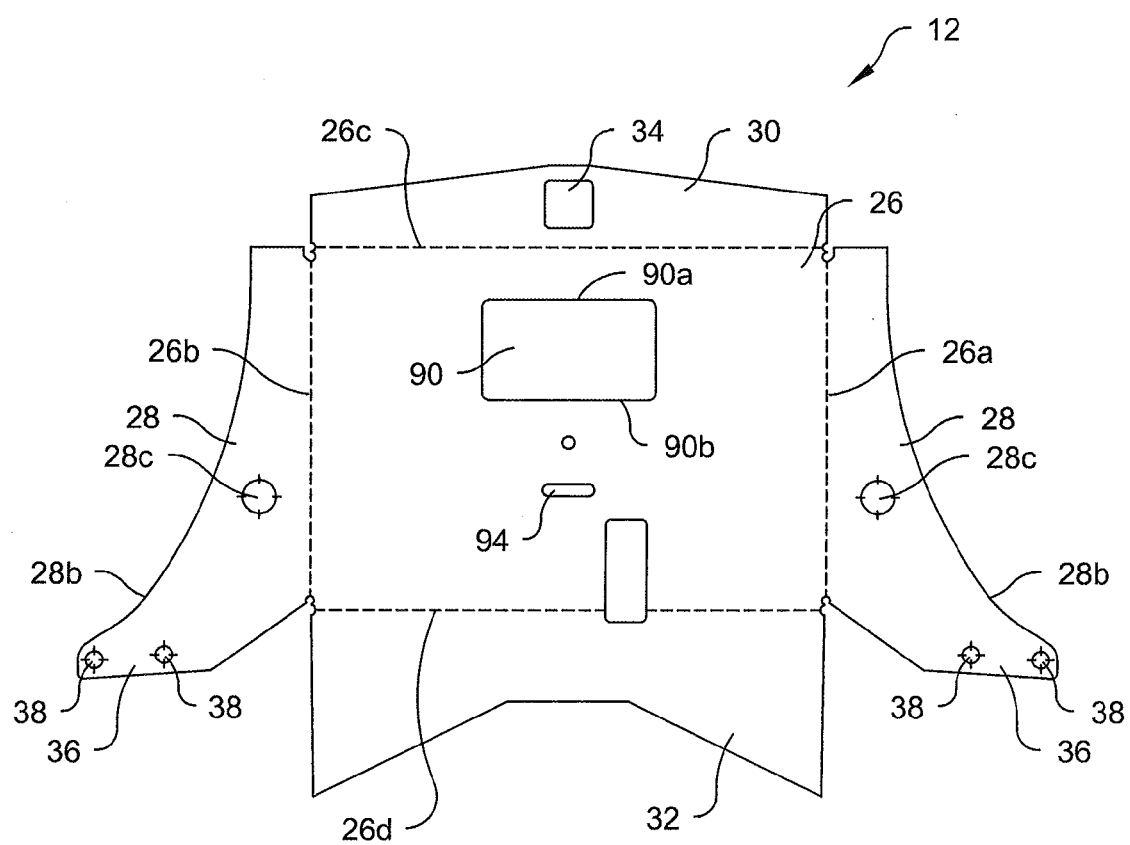
FIG. 5 is a top plan view of the base plate of the drum truck of FIG. 1 before the base plate is formed in the disclosed configuration.

Referring to FIG. 5, the base 12 has a generally rectangular-shaped base plate 26 having a right edge 26a, a left edge 26b, an upper edge 26c and a lower edge 26d. Supports 28 extend forwardly and perpendicularly from the right and left edges 26a, 26b of the base plate 26. An upper plate 30 and a lower plate 32 extend between the supports 28 forwardly and perpendicularly from the upper edge 26c and the lower edge 26d of the base plate 26, respectively. The supports 28 and the upper and lower plates 30 and 32 may be separate parts attached to the base plate 26 by weldments. Alternatively and preferably, the base plate 26, the supports 28 and the upper and lower plates 30, 32 may be formed from a single sheet of material by bending the supports 28 ninety degrees toward each other, by bending the upper and lower plates 30, 32 ninety degrees toward each other and by attaching the adjacent edges to each other by weldments to form the base 12 as shown in FIG. 2.

The upper plate 30 has a centrally located opening 34 through which a portion of the post 16 can pass. Each support 28 has a forwardly extending lower portion 28b configured as a mount 36 with at least one and preferably two through-holes 38 to which one toe of the pair of toes 20 may be attached.

Figure 6:
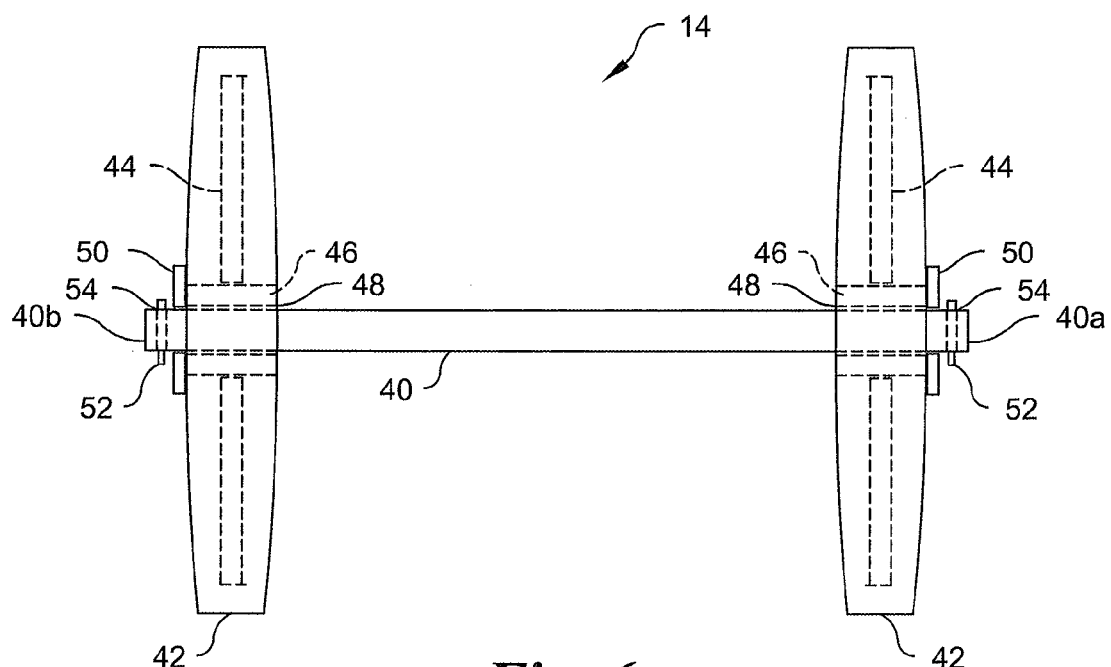
FIG. 6 is a front elevation view of the wheel assembly of the drum truck of FIG. 1.
Figure 7:
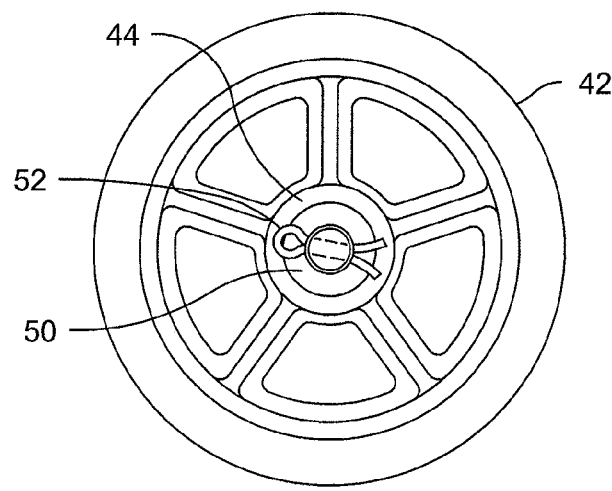
FIG. 7 is a side elevation view of a wheel of the wheel assembly of FIG. 6.

Referring to FIGS. 6 and 7, the wheel assembly 14 comprises an axle 40 having a first end 40a and a second end 40b. Each wheel 42 of a pair of wheels 42 has a hub 44 in which a bearing 46 is mounted. The bearing 46 has an inner race with a bore 48 which is removably mountable on the axle 40 by inserting one of the first and second ends 40a, 40b through the bore. In some embodiments each wheel 42 of the pair of wheels 42 may have a plain bore that rides over and contacts the axle 40 directly. Each wheel is retained on the axle 40 by a flat washer 50 and a removable fastener 52 inserted in a diametrical through-hole 54 in the axle 40 proximal to the first and second ends 40a, 40b. In some embodiments of the wheel assembly 14, the fastener may be a cotter pin. In other embodiments, the wheels may be retained on the axle 40 by other removable fasteners such as threaded cap or split ring if the first and second ends 40a, 40b of the axle 40 are suitably modified to receive such fasteners. The wheels 42 may be fabricated from a variety of materials including but not limited to polymeric materials such as polyurethane, or polyolefin, metals such as steel or aluminum or various composite materials.

Figure 2:
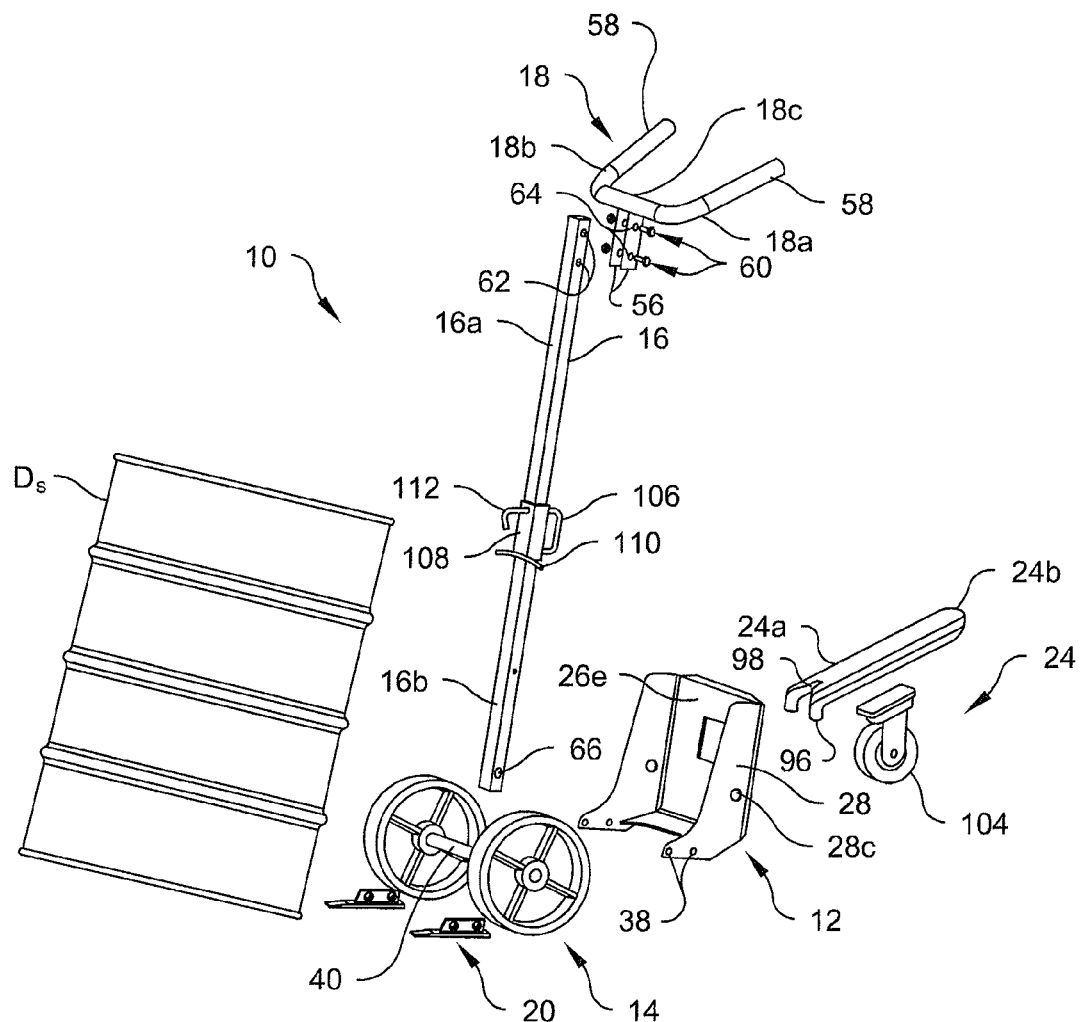
FIG. 2 is an exploded perspective view of the drum truck of FIG. 1.
Figure 3:
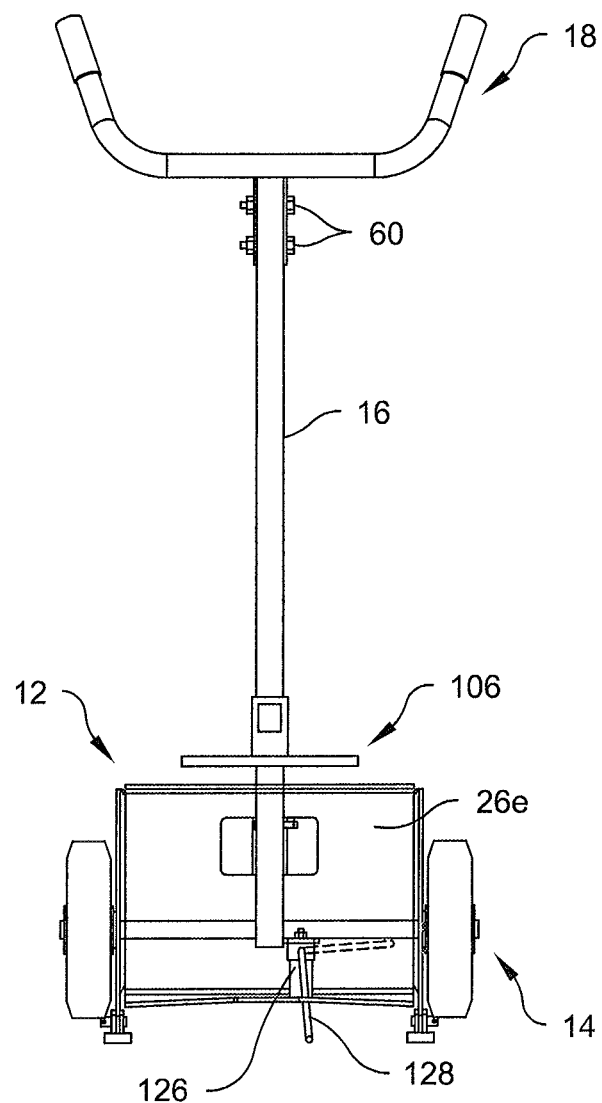
FIG. 3 is a rear elevation view of the drum truck of FIG. 1.

Referring to FIG. 2, the post 16 is preferably a tube having a generally rectangular or square cross section. In some embodiments, the post 16 may desirably have a generally circular or oval cross section.

The handle 18 has a first end 18a spaced from a second end 18b by a central portion 18c from which a pair of elongated plates 56 extend. The pair of elongated plates 56 are spaced apart a distance sufficient to removable receive therebetween the upper end 16a of the post 16. A handgrip 58 extends outwardly and rearwardly from each of the first and second ends 18a, 18b at an obtuse angle with respect to both the central portion 18c of the handle 18 between the handgrips 58 and the pair of elongated plates 56. Alternatively, the handle 18 may be rotated one-hundred eighty degrees about the axis of the post 16 prior to insertion of the upper end of the post 16a between the pair of elongated plates 56. The handle 18 is secured to the upper end 16a of the post 16 by a pair of fasteners 60 removable insertable in a pair of through-holes 62 in the upper end 16a of the post 16 and corresponding pairs of through-holes 64 in the pair of elongated plates 56 of the handle 18. Preferably, the fasteners 60 are a pair of threaded bolts and corresponding nuts. In some embodiments the bolts and nuts may be replaced with other types of fasteners such as clevis fasteners or a pins and cotter pins. Proximal the lower end 16b of the post 16 a through-hole 66 is provided for passage of the axle 40 therethrough. In some embodiments, the post 16 may a solid rod provided with a sleeve at the upper end for releasably receiving the stem 56 of the handle 18.

Figure 8:
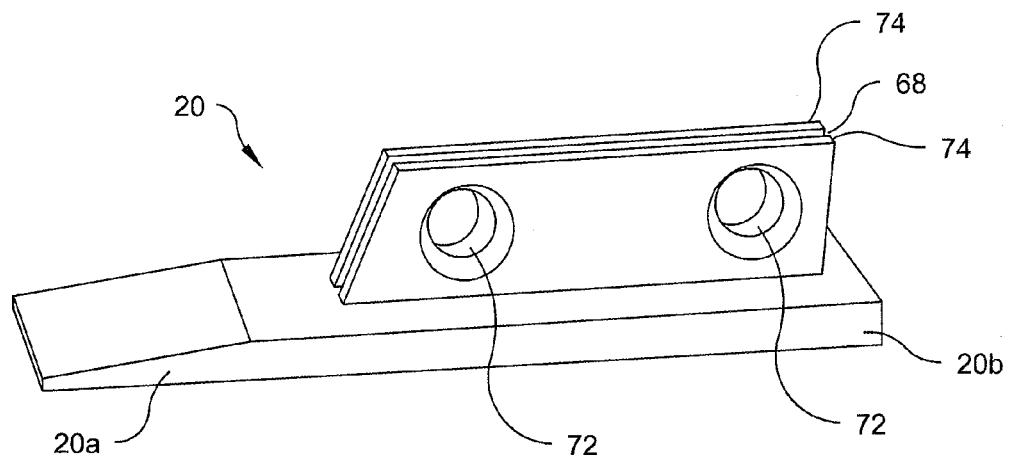
FIG. 8 is a left side perspective view of a preferred embodiment of a toe mountable on the drum truck of FIG. 1 and for use with a steel drum.

Referring to FIG. 8, in some embodiments of the drum truck 10, the at least one pair of toes 20 is configured for use with a steel drum $D_s$. Each toe 20 of the pair of toes 20 has a first end 20a and a second end 20b. The first or forwardly facing end 20a is configured to operatively engage the bottom of the steel drum $D_s$ and the second or rearwardly facing end 20b is configured to be removable attached to the mounts 36 of the supports 28. Preferably, the rearwardly facing end 20b has a channel 68 for receiving the mount 36 and is releasably secured to the mount 36 by a pair of removable fasteners 70 inserted in a pair of through-holes 72 in the sidewalls 74 of the channel 68 in register with the pair of through-holes 38 in the mount 36. Preferably the fasteners are a combination of a bolt and nut, cotter pin or a clevis fastener. Alternatively, in some embodiments the fasteners may be a threaded bolt and nut. When the drum to be handled is a steel drum $D_s$ the first or forwardly facing end 20a of each toe 20 preferably has a generally rectangular shape with a forward taper.

Figure 9:
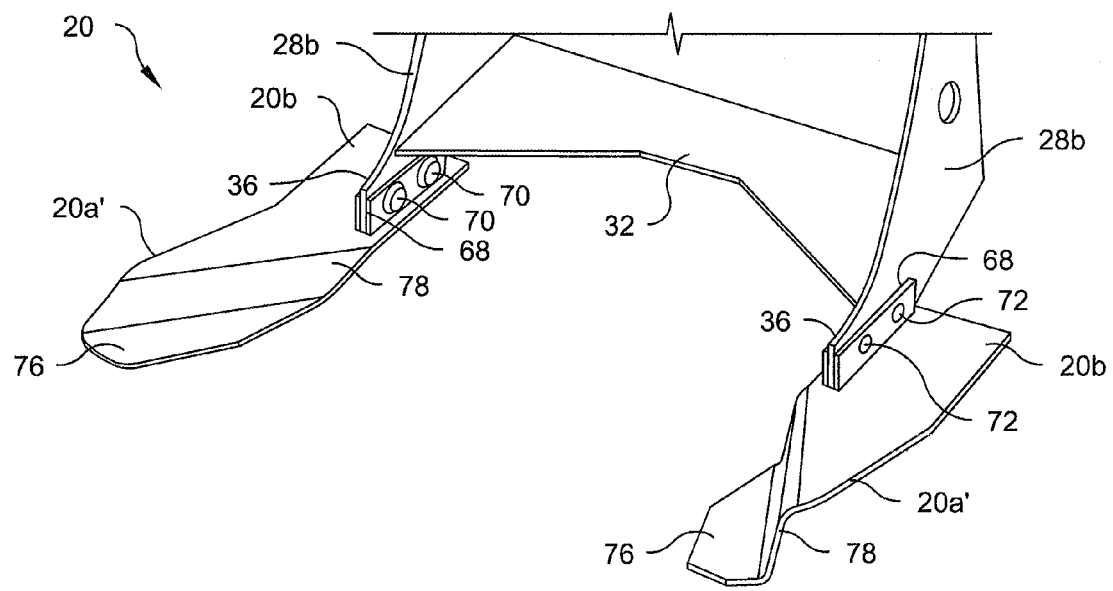
FIG. 9 is a left side perspective view of a preferred embodiment of a toe mountable on the drum truck of FIG. 1 and for use with a polymeric drum.

Referring to FIG. 9, in some embodiments of the drum truck 10, the at least one pair of toes 20 is configured for use with a polymeric drum $D_p$. Each toe 20 of the pair of toes 20 has a first end 20a' and a second end 20b. The first or forwardly facing end 20a' of each toe of the pair of toes is a mirror image of the other and has a tongue 76 offset by a downward step 78 formed in the toe at an angle relative to the second end 20b. The second or rearwardly facing end 20b is configured to be removable attached to the mount 36 of the supports 28 in the same manner as the pair of toes 20 for use with a steel drum $D_s$.

One or more interchangeable breakover members 22, 24 may be provided to facilitate tilting the drum truck 10 with a drum $D_s$, $D_p$ secured thereto by providing a structure to which an operator may apply foot pressure which helps to break over the drum truck 10 from a standing vertical position to an angled position for movement of the drum $D_s$, $D_p$ from an initial location to a desired location.

Figure 10:
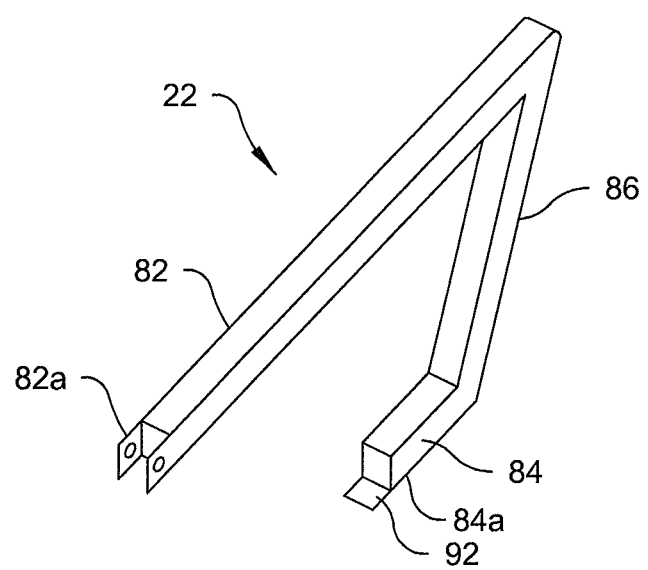
FIG. 10 is a left side perspective view of a preferred embodiment of the back rest/breakover bar of the drum truck of FIG. 4 and for use with a polymeric drum and/or steel drum.
Figure 11:
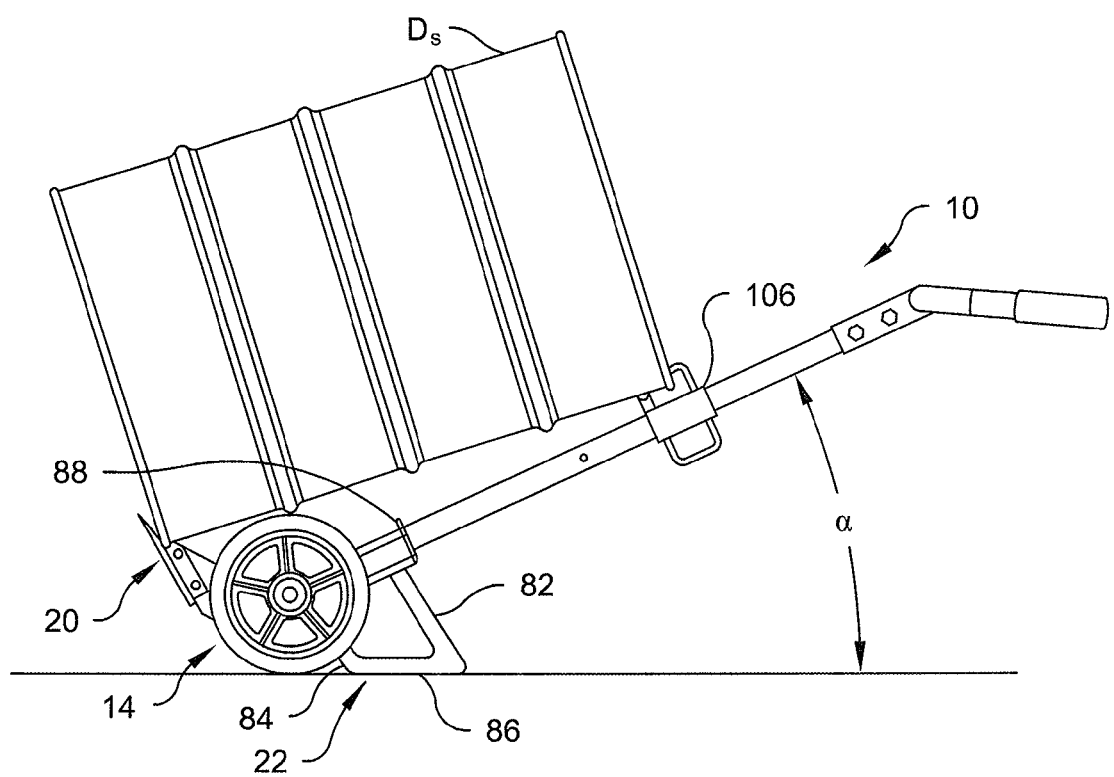
FIG. 11 is a left side elevation view of the drum truck of FIG. 4 with the back rest/breakover bar supporting the drum truck of FIG. 4 in an inclined position.

Referring to FIGS. 10 and 11, in some embodiments, the breakover member may be the back rest/breakover bar 22 removably attachable to the drum truck 10 and configured to allow the drum truck, with or without a drum $D_s$, $D_p$ attached, to be tilted such that the post 16 is inclined at an acute angle α relative to a horizontal plane and supported at the acute angle by the back rest/breakover bar 22. The acute angle α may by any angle within a range of angles and is suggestedly at least about fifteen degrees, desirably twenty or more degrees, preferably between about twenty five to thirty-seven degrees, less preferably up to forty-five degrees but no more than sixty degrees. Preferably, the back rest/breakover bar 22 is a bar-like structure generally configured in the shape of a partial trapezoid comprising a first arm 82 spaced from and parallel to a second arm 84 shorter in length than the first arm and a third arm 86 angled with respect to the first and second arms 82, 84 and connected to the first and second arms by weldments. Alternatively, the back rest/breakover bar 22 may be formed from a single bar appropriately bent to have the foregoing configuration with the first and second arms being contiguous with the third arm. The open end 82a of the first arm 82 forms a U-shaped channel sized to receive therein and be removably attached to the post 16 by a releasable fastener 88 when the open end 82a is inserted through a central opening 90 in the base plate 26. The open end 84a of the second arm 84 has an offset lip 92 that is insertable in a slot 94 in the base plate 26 below the central opening 90.

Figure 12A:
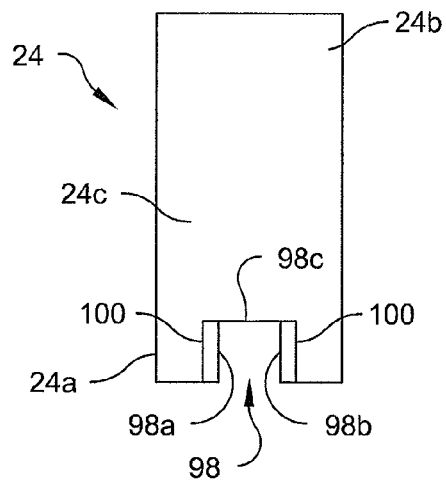
FIG. 12A is a top plan view of the $3^{rd}$ wheel/breakover bracket of the drum truck of FIG. 1.
Figure 12B:
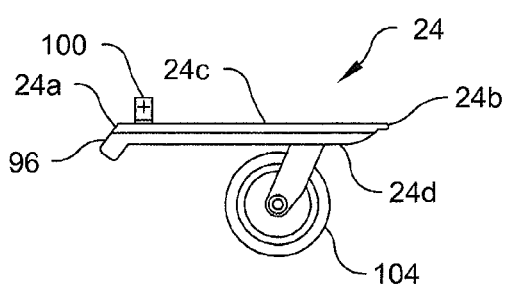
FIG. 12B is a left side elevation view of the $3^{rd}$ wheel/breakover bracket of the drum truck of FIG. 1.
Figure 13:
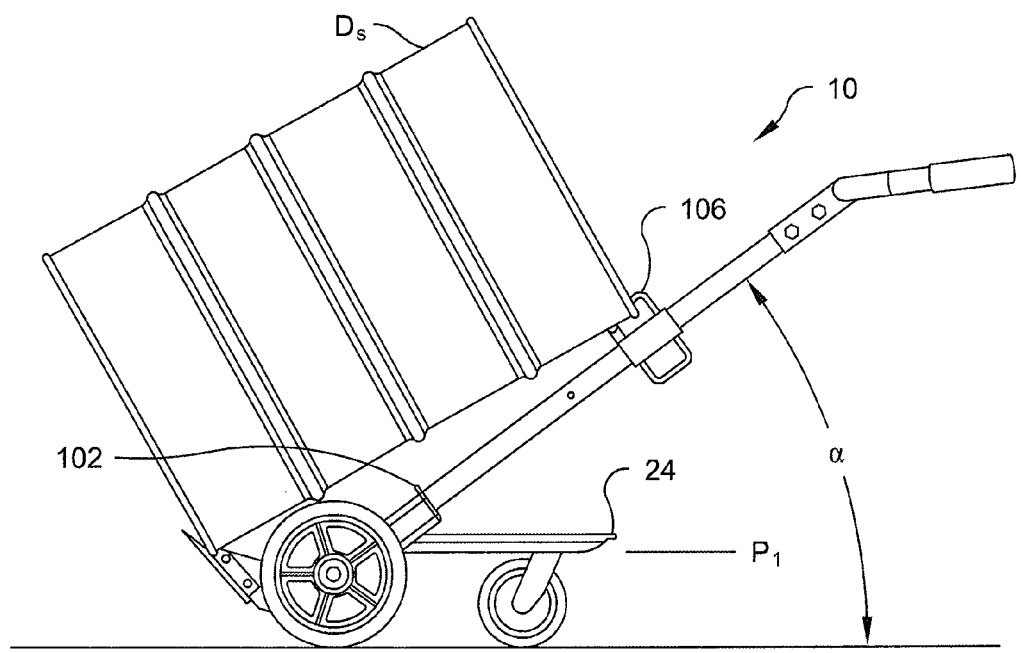
FIG. 13 is a left side elevation view of the drum truck of FIG. 1 with the $3^{rd}$ wheel/breakover bracket in the first position.
Figure 14:
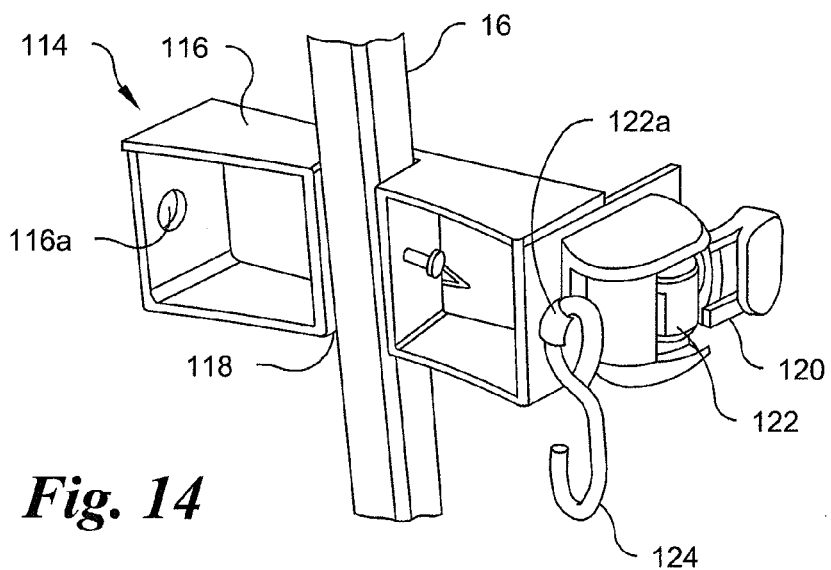
FIG. 14 is a front perspective view of a preferred embodiment of a belt assembly mountable on the post of the drum truck of FIG. 1.

Referring to FIGS. 12A, 12B, and 13, in some embodiments of the drum truck 10, the $3^{rd}$ wheel/breakover bracket 24 may replace the back rest/breakover bar 22. The $3^{rd}$ wheel/breakover bracket 24 is a structure removably and pivotably attachable to the drum truck 10 and configured to allow the drum truck 10, with or without a drum $D_s$, $D_p$ attached thereto, to be tilted such that the post 16 is inclined at an acute angle α relative to a horizontal plane and to be supported at the acute angle by the $3^{rd}$ wheel/breakover bracket 24. The acute angle α may by any angle within a range of angles and is suggestedly at least about fifteen degrees, desirably twenty or more degrees, preferably between about twenty five to thirty-seven degrees, less preferably up to forty-five degrees but no more than fifty degrees. Preferably, the $3^{rd}$ wheel/breakover bracket 24 is a plate-like structure having a first end 24a, a second end 24b, an upper surface 24c and a lower surface 24d. The first end 24a has a stop 96 angled downwardly and a centrally located slot 98 sized to receive therein the post 16. Mounts 100 extending upwardly from the upper surface 24c on a first side 98a of the slot 98 and on a second side 98b of the slot 98 spaced from the first side 98a of the slot 98 by a third side 98c are configured to be removably and pivotably attached to the post 16 by a releasable fastener 102, such as a clevis fastener, when the first end 24a is inserted through the central opening 90 in the base plate 26. A pivot wheel caster 104, such as a caster wheel, is pivotably attached to the lower surface 24d proximal to the second end 24b.

Preferably, the central opening 90 in the base plate 26 has a generally rectangular shape with an upper edge 90a spaced from a lower edge 90b (see, FIG. 5) a distance sufficient to allow the $3^{rd}$ wheel/breakover bracket 24 to pivot from a first position $P_1$ in which the upper surface 24c of the $3^{rd}$ wheel/breakover bracket 24 is proximal to the upper edge 90a of the central opening 90 (see, FIG. 13) to a second position $P_2$ in which the lower surface 24d of the $3^{rd}$ wheel/breakover bracket 24 is proximate to the lower edge 90b of the opening 90 (see, FIG. 1).

In some embodiments, when the $3^{rd}$ wheel/breakover bracket 24 is in the first position $P_1$, the upper surface 24c of the $3^{rd}$ wheel/breakover bracket is in contact with the upper edge 90a of the central opening 90 and the stop 96 is in contact with the forward-facing surface 26e of the base plate 26. In some embodiments, when the $3^{rd}$ wheel/breakover bracket 24 is in the second position $P_2$, the post 16 is in contact with the third side 98c of the slot 98. The angular range of motion of the $3^{rd}$ wheel/breakover bracket 24 between the first position $P_1$ and the second position $P_2$ is suggestedly at least about fifteen degrees, desirably twenty or more degrees, preferably between about twenty five to thirty-seven degrees, less preferably up to forty-five degrees but no more than sixty degrees.

In some embodiments, when the $3^{rd}$ wheel/breakover bracket 24 is in the first position $P_1$, the pivot wheel caster 104 is in contact with the surface supporting the drum truck 10 and in cooperation with the pair of wheels 42 provides a three-point support for the drum truck 10 which facilitates movement. (See, FIG. 13) In some embodiments, when the $3^{rd}$ wheel/breakover bracket is in the second position $P_2$, the pivot wheel caster 104 is spaced from the supporting surface and the upper surface 24a of the $3^{rd}$ wheel/breakover bracket 24 is positioned and configured to function as a lever able to receive a user's foot at an ergonomically favorable position for applying a force to the drum truck 10 to assist in tilting or pivoting the drum truck 10 to a break-over position when a drum $D_s$, $D_p$ is secured to the drum truck 10. (See, FIG. 1)

One or more interchangeable drum restraints 106, 114 may be provided to secure the drum $D_s$, $D_p$ to the drum truck 10. The configuration of the drum restraint may vary depending upon the type of drum being handled. For example, if the drum is a steel drum $D_s$, the preferred restraint is a chime hook assembly 106 comprising a collar 108 slidable on the post 16 and releasably mountable to the post 16 at various locations along the length of the post 16. A restraining mount 110 extending outwardly from the collar 108 is configured to engage the outer surface of the drum $D_s$ and has a hook 112 to engage the rim of the drum $D_s$.

Alternatively, if the drum is a polymeric drum $D_p$, the preferred restraint is a belt restraint 114 comprising a frame 116 having a channel 118 therein and a belt mechanism 120 housing a belt 122. The channel 118 is slidable on the post 16 and releasably mountable to the post 16 at various locations along the length of the post 16 by a removable fastener configured. The belt mechanism 120 allows one end 122a of the belt 122 to be retractably extended around the drum $D_p$. A hook 124 is provided at the one end 122a of the belt 122 and is insertable in a through-hole 116a' in the frame 116. When the one end 122a of the belt 122 has been extended around the drum $D_p$, and the hook 124 has been inserted in the through-hole 116a in the frame 116, tensioning the belt with the belt mechanism 120 secures the drum $D_p$ to the drum truck 10.

Figure 4:
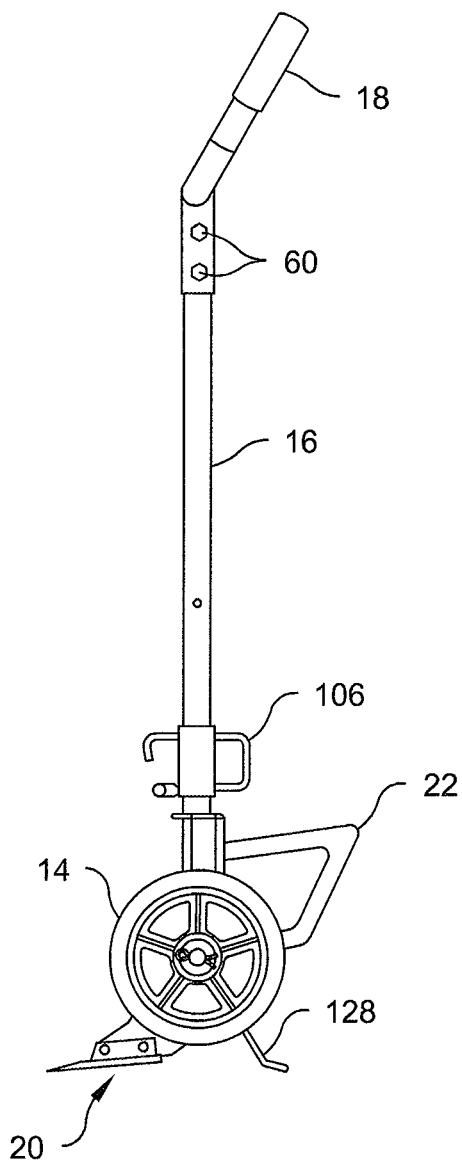
FIG. 4 is a left side elevation view of the drum truck of FIG. 1.

A kick stand 126 (see, FIGS. 3 and 4) having a leg 128 biased in a retracted position may be removably attached to the base plate 26 preferably near the lower edge 26d. In the extended position, the leg 128 enables the drum truck 10 to remain in an upright position (as shown in FIG. 4), supported by the pair of wheels 42 and the leg 128.

The foregoing components are preferably designed for ease of assembly and disassembly. Accordingly, where practicable, the components comprising the various embodiments of the drum truck 10 are designed to be configurable using different combinations of any of the embodiments to be operatively coupled and decoupled by removable fasteners such as a clevis fastener, and other peg and pin-like fasteners. Alternatively, in some embodiments, the clevis-like fasteners may be replaced with threaded fasteners, such as a bolt and nut, or other removable fasteners without departing from the spirit of the invention.

An arrangement of components comprising some embodiments of the drum truck 10 (see, FIG. 16) are preferably shipped disassembled as a package having a package measurement less than about one-hundred thirty inches and determined by adding a length of a longest side of the package to a girth of the package, the girth being equal to about twice a width of the package plus twice a height of the package, for assembly on site.

Typically, the drum truck 10 is assembled by first attaching one toe of the pair of toes 20 having the desired configuration (e.g., for either a steel drum or polymeric drum) to each support 28 extending from the base plate 26 by placing the mount 36 in the channel 68 of the second or rearwardly extending end 20b of the toe 20 and inserting and releasably securing a fastener 70 in the through-holes 72 in the sidewalls 74 of the channel 68 and the through-holes 38 in the mount 36.

Next, the kick stand 122 may be removably attached to the base plate 26, preferably near the lower edge 26d such that the leg 124 of the kick stand 122 may be rotated from a retracted to an extended position by a user's foot. In this state, the base plate 26 may be supported in a upright position by the pair of toes 20 and the kick stand 122 for ease in further assembling the drum truck.

The wheel assembly 14 and post 16 may now be attached to the base plate 26 by inserting the lower end 16b of the post 16 through the centrally located opening 34 in the upper plate 30 of the base plate 26 such that the through-hole 66 in the lower end 16b of the post 16 is in alignment with the through-holes 28c in the lower, rearward portion of the supports 28. Next, the axle 40 is inserted through the through-hole 28c in one of the supports, through the through-hole 66 in the lower end 16b of the post 16 and then through the through-hole 28c in the other support 28. The pair of wheels 42 are then mounted on the first and second ends 40a, 40b of the axle 40 by inserting the respective ends through the bore 48 in the bearing 46 of each wheel hub 44 (or alternatively through the plain bore in a bearingless wheel), followed by the flat washer 50 and secured to the axle 40 by a wheel fastener 52 removably inserted in the through-hole 54 in each end of the axle.

Prior to attaching the handle 18 to the post 16, the chime hook assembly 106 may be attached to the post 16 by sliding the collar 108 of the chime hook assembly 106 over the post 16. The handle 18 is then attached to the post 16 by inserting the upper end 16a of the post 16 between the pair of elongated plates 56 extending from the central portion 18c of the handle 18 and securing the post 16 to the pair of elongated plated 56 by inserting the pair of fasteners 60 removable insertable in the pair of through-holes 62 in the upper end 16a of the post 16 and corresponding pairs of through-holes 64 in the pair of elongated plates 56 of the handle 18.

Depending on the user's preference, the back rest/breakover bar 22 or the $3^{rd}$ wheel/breakover bracket 24 may now be attached to the base plate 26. If the back rest/breakover bar 22 is selected, the offset lip 92 of the open end 84a of the second arm 84 of the back rest/breakover bar 22 is inserted in the slot 94 in the base plate 26 below the central opening 90 and the U-shaped open end 82a of the first arm 82 is inserted through the central opening 90 in the base plate 26 and removably attached to the post 16 by a releasable fastener 88.

Alternatively, if the $3^{rd}$ wheel/breakover bracket 24 is selected, the first end 24a of the $3^{rd}$ wheel/breakover bracket 24 is inserted through the central opening 90 in the base plate 26 such that the stop 96 is angled downwardly and the centrally located slot 98 receives the post 16 therein. The mounts 100 extending upwardly from the upper surface 24c on a first side 98a of the slot 98 and on a second side 98b of the slot 98 are removably and pivotably attached to the post 16 by a removable fastener 102.

When the drum truck 10 is fully assembled and in use, to handle a drum $D_s$, $D_p$, the forward facing end 20a of the each toe of the pair of toes 20 operatively engages the bottom of the drum $D_s$, $D_p$ by being inserted under the drum. If the drum is steel, the drum restraint 106 secures the drum $D_s$ to the post 16 by positioning the collar 108 of the restraint 106 at the appropriate position along the length of the post 16 such that the restraint hook 112 engages the upper rim of the drum $D_s$. If the drum is polymeric, the belt restrains 122 secures the drum $D_p$ to the post 16 by extending the one end 122a of the belt 122 around the upper portion of the drum $D_p$, inserting the hook 124 at the one end 122a of the belt 122 in the through-hole 116a of the frame 116 and tightening the belt 122 with the belt mechanism 120.

Figure 15:
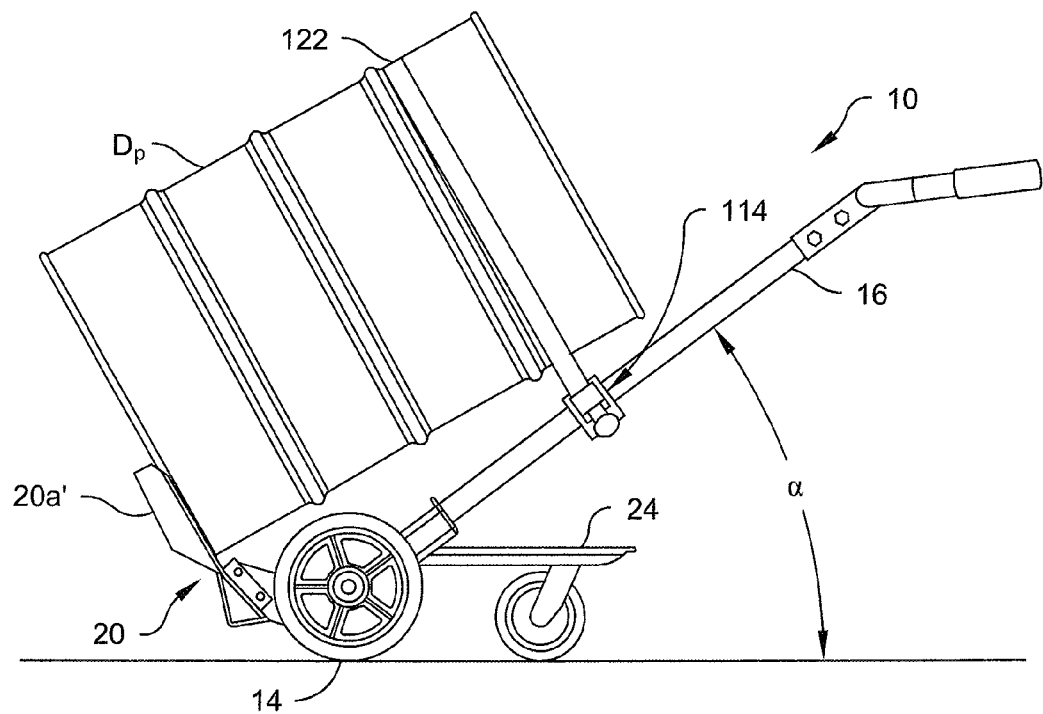
FIG. 15 is a left side elevation view of the drum truck of FIG. 1 with the belt assembly of FIG. 14 securing a polymeric drum to the drum truck.
Figure 16:
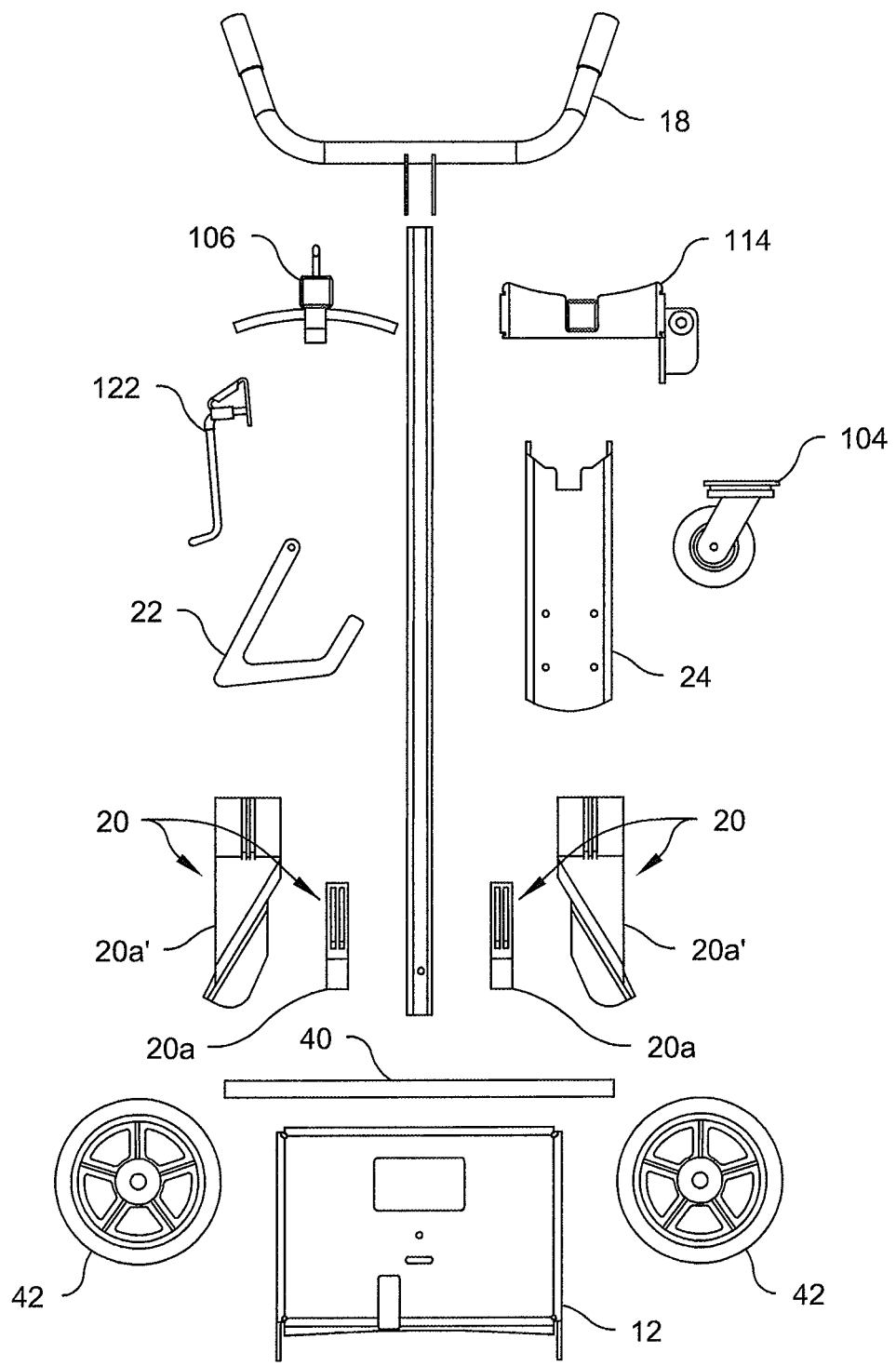
FIG. 16 is a 2D Solid Works drawing of an arrangement of the components comprising the drum truck of FIG. 1 laid out for packaging in a shipping container.

Once the drum $D_s$, $D_p$ is secured to the drum truck 10, the back rest/breakover bar 22 or the $3^{rd}$ wheel/breakover bracket 24 may be used as a lever to which application of an operator's foot pressure may cause the drum $D_s$, $D_p$ to pivot from a standing upright vertical position to a break over position for movement of the drum $D_s$, $D_p$ and drum truck 10 supported solely by the wheel assembly 14 or upon further pivoting past the break over position for stationary support of the drum $D_s$, $D_p$ by the wheel assembly 14 and back rest/breakover bar 22 or for three wheeled support and movement by the wheel assembly 14 and pivot wheel caster 104, such as the position shown in FIGS. 11, 13 and 15.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

We claim:

1. A drum truck for handling a drum, the drum truck comprising:
   a base having a first-axle through-hole therein and a second-axle through-hole therein spaced from the first-axle through-hole;
   a wheel assembly having an axle removably attached to the base;
   a post removably attached to the base, a lower end of the post having a post through-hole therein;
   a breakover member removably and operatively coupled to the base, the breakover member configured to allow application of a foot pressure to break over the drum truck from a standing vertical position to an angled position;
   at least one pair of toes removably attached to the base and configured to support the drum; and
   a drum restraint removably attached to the post and configured to releasably secure the drum to the post,
   wherein the base has a centrally located opening through which the lower end of the post passes, and
   wherein the axle passes through the first-axle through-hole in the base, the post through-hole in the lower end of the post and the second-axle through-hole in the base.

2. The drum truck according to claim 1, wherein the breakover member is a backrest-breakover bar configured to allow the drum truck to be tilted such that the post is inclined at an acute angle relative to a horizontal plane and to be supported at the acute angle by the back rest-breakover bar and by the wheel assembly.

3. The drum truck according to claim 2, wherein the acute angle is between twenty-five degrees and thirty-seven degrees.

4. The drum truck according to claim 2, wherein the base comprises a base plate having a central opening and a slot below the central opening and the breakover member is a bar-like structure configured in the shape of a partial trapezoid comprising a first arm spaced from and parallel to a second arm shorter in length than the first arm and a third arm angled with respect to the first and second arms and connecting the first arm to the second arm, an open end of the first arm inserted through the central opening in the base plate and removably attached to the post by a releasable fastener, an open end of the second arm having an offset lip inserted in the slot in the base.

5. The drum truck according to claim 1, wherein the breakover member is a third-wheel breakover bracket removably and pivotably coupled to the base and configured to allow the drum truck to be tilted such that the post is inclined at an acute angle relative to a horizontal plane and to be supported at the acute angle by a pivot wheel caster pivotably attached to the third-wheel breakover bracket and by the wheel assembly.

6. The drum truck according to claim 5, wherein the acute angle is between twenty-five degrees and thirty-seven degrees.

7. The drum truck according to claim 5, wherein the base has a base plate with a central opening having an upper edge spaced from a lower edge and the third-wheel breakover bracket extends through the opening, is removably and pivotably attached to the post and pivots from a first position in which an upper surface of the third-wheel breakover bracket is proximal to the upper edge of the central opening to a second position in which the lower surface of the third-wheel breakover bracket is proximate to the lower edge of the central opening, wherein when the third-wheel breakover bracket is in the first position, the post is inclined at the acute angle relative to the horizontal plane and the drum truck is supported at the acute angle by the pivot wheel caster and by the wheel assembly.

8. The drum truck according to claim 5, wherein the base comprises a base plate having a central opening, the third-wheel breakover bracket comprises: a plate-like structure having a first end, a second end, an upper surface and the lower surface, the first end having a stop angled downwardly and a centrally located mount extending upwardly from the upper surface, and wherein the first end of the plate-like structure extends through the central opening and the post is removably and pivotably attached to the mounts by a removable fastener.

9. The drum truck according to claim 8, wherein when the third-wheel breakover bracket is in a first position, the upper surface of the third-wheel breakover bracket is in contact with the upper edge of the central opening and the stop is in contact with a forward-facing surface of the base plate.

10. The drum truck according to claim 1, wherein the handle is removably attached to the post and reversible.

11. The drum truck according to claim 1, wherein the base has a base plate having a first edge from which a first support extends generally forwardly and perpendicularly and a second edge spaced from the first edge and from which a second support extends generally forwardly and perpendicularly, each of the first and second supports having a mount and each toe of the at least one pair of toes has a first end configured to operatively engage and support a bottom of the drum and a second end removably attached to one of the mounts.

12. The drum truck according to claim 11, wherein the drum is a steel drum and the first end of each toe of the pair of toes has a generally rectangular shape with a forward taper to operatively engage the bottom of the steel drum.

13. The drum truck according to claim 11, wherein the drum is a polymeric drum and the first end of each toe of the pair of toes is a mirror image of the other and has a tongue offset by a downward step formed in the toe at an angle relative to the second end to operatively engage the bottom of the polymeric drum.

14. The drum truck according to claim 1, wherein the drum restraint is a chime hook assembly comprising: a collar slidable on the post and releasably mountable to the post at a plurality of locations along a length of the post; a restraint mount extending outwardly from the collar and configured to engage the outer surface of a steel drum and a hook configured to engage a rim of the drum.

15. The drum truck according to claim 1, wherein the drum is a polymeric drum and the drum restraint is a belt restraint comprising: frame having a channel slidable on the post and releasably mountable to the post at a plurality of locations along a length of the post by a removable fastener; and a belt mechanism housing a belt, the belt mechanism supported by the frame and configured to allow one end of the belt to be retractably extended around the drum, to be secured to the frame by a hook extending from the one end of the belt and inserted in a through-hole in the frame and to be tensioned to secure the drum to the drum truck.

16. The drum truck according to claim 1, further comprising kick stand removably attached to the base plate and having a leg biased in a retracted position and movable to an extended position enabling the drum truck to remain in an upright position supported by the pair of wheels and the leg.

17. The drum truck according to claim 1, wherein the base has a generally rectangular-shaped base plate having a first edge from which a first support extends generally forwardly and perpendicularly and the first-axle through-hole is in the first support, a second edge spaced from the first edge and from which a second support extends generally forwardly and perpendicularly and the second-axle through-hole is in the second support, a third edge extending from the first edge to the second edge and from which an upper plate extends forwardly and perpendicularly between the first support and the second support and a fourth edge spaced from the third edge and from which a lower plate extends forwardly and perpendicularly between the first support and the second support, the upper plate having the centrally located opening therein.

18. An arrangement comprising the disassembled components of the drum truck of claim 1, wherein the arrangement is shippable as a package having a package measurement less than about one-hundred thirty inches, the package measurement being determined by adding a length of a longest side of the package to a girth of the package, the girth being equal to about twice a width of the package plus twice a height of the package.

* * * * *